(12) United States Patent
Miller et al.

(10) Patent No.: US 7,292,750 B2
(45) Date of Patent: Nov. 6, 2007

(54) SIGNAL PROCESSING SYSTEM

(75) Inventors: Lee D Miller, Filton (GB); Martyn R Jennings, Filton (GB)

(73) Assignee: MBDA UK Limited, Stevenage, Hertfordshire (GB)

(*) Notice: Subject to any disclaimer, the term of this patent is extended or adjusted under 35 U.S.C. 154(b) by 0 days.

(21) Appl. No.: 10/519,946

(22) PCT Filed: Nov. 16, 2004

(86) PCT No.: PCT/GB2004/004842

§ 371 (c)(1),
(2), (4) Date: Dec. 29, 2004

(87) PCT Pub. No.: WO2005/052632

PCT Pub. Date: Jun. 9, 2005

(65) Prior Publication Data

US 2006/0088245 A1    Apr. 27, 2006

(30) Foreign Application Priority Data

Nov. 20, 2003 (EP) .................... 03257338
Nov. 20, 2003 (GB) .................... 0327037.8

(51) Int. Cl.
*G02B 6/26* (2006.01)
*G02B 6/42* (2006.01)

(52) U.S. Cl. .............. 385/31; 385/32; 385/41
(58) Field of Classification Search .......... 385/31
See application file for complete search history.

(56) References Cited

U.S. PATENT DOCUMENTS

| | | | |
|---|---|---|---|
| 3,633,035 A | 1/1972 | Uchida et al. .............. 250/199 |
| 4,268,116 A * | 5/1981 | Schmadel et al. .............. 385/1 |
| 4,633,428 A | 12/1986 | Byron .................... 364/841 |
| 4,652,885 A * | 3/1987 | Saffold et al. .............. 343/725 |
| 4,691,312 A * | 9/1987 | Vlasak .................... 398/43 |
| 4,699,513 A | 10/1987 | Brooks et al. .............. 356/345 |
| 5,118,934 A * | 6/1992 | Hailey et al. .............. 250/366 |
| 5,307,073 A * | 4/1994 | Riza .................... 342/372 |
| 5,400,038 A * | 3/1995 | Riza et al. .............. 342/375 |
| 5,546,483 A * | 8/1996 | Inoue et al. ............. 385/14 |
| 6,246,822 B1 * | 6/2001 | Kim et al. .............. 385/116 |
| 6,363,183 B1 * | 3/2002 | Koh ..................... 385/19 |
| 6,411,835 B1 * | 6/2002 | Modell et al. ............. 600/407 |
| 6,445,841 B1 * | 9/2002 | Gloeckner et al. .......... 385/17 |

(Continued)

FOREIGN PATENT DOCUMENTS

EP    1 154 639 A1    11/2001
WO    02/29436 A1    4/2002

OTHER PUBLICATIONS

EP Search Report, no date.
GB Search Report, no date.

*Primary Examiner*—Frank G. Font
*Assistant Examiner*—Mary El-Shammaa
(74) *Attorney, Agent, or Firm*—Nixon & Vanderhye P.C.

(57) ABSTRACT

A signal processing system (10) has a plurality of optical fibers (40, 42, 43) with their one ends (40) mounted in an array board (41) to receive electromagnetic radiation. A coupler (54) interconnects the other ends of the optical fibers (42, 43) in parallel such that electromagnetic radiation is first coupled together and then directed into two or more independent processing channels (45, 47).

20 Claims, 1 Drawing Sheet

U.S. PATENT DOCUMENTS

| | | | |
|---|---|---|---|
| 6,483,962 B1* | 11/2002 | Novotny | 385/18 |
| 6,609,840 B2* | 8/2003 | Chow et al. | 398/102 |
| 6,625,341 B1* | 9/2003 | Novotny | 385/18 |
| 6,754,410 B1* | 6/2004 | Doerr et al. | 385/16 |
| 6,904,239 B2* | 6/2005 | Chow et al. | 398/49 |
| 6,941,036 B2* | 9/2005 | Lucero | 385/22 |
| 6,950,570 B1* | 9/2005 | Novotny | 385/18 |
| 7,087,886 B2* | 8/2006 | Almi et al. | 250/227.12 |
| 2001/0004411 A1* | 6/2001 | Yariv | 385/28 |
| 2002/0131692 A1* | 9/2002 | Chen et al. | 385/24 |
| 2003/0026515 A1* | 2/2003 | Barenburg et al. | 385/14 |

\* cited by examiner in the transmission time of pulsed electromagnetic radiation. Such delays are conveniently achieved by using optical fibres of differing lengths so that they operate as delay lines. Arrays of 3×3 optical fibres are taught, each optical fibre connected to single avalanche photo-diode (APD).

SIGNAL PROCESSING SYSTEM

This application is the U.S. national phase of international application PCT/GB04/04842 filed Nov. 16, 2004 which designated the U.S. and claims benefit of GB 0327037.8 and EP 03257338.8, dated Nov. 20, 2003, the entire content of each of which is hereby incorporated by reference.

BACKGROUND OF THE INVENTION

1. Field of the Invention

This invention relates to an electromagnetic signal processing system and more specifically, but not exclusively, to a system of processing an optical signal.

2. Discussion of Prior Art

WO02/29436 teaches that a laser-radar receiver should comprise an array of optical fibres which are connected to at least one radiation detector, each optical fibre having different physical characteristics which result in known delays in the transmission time of pulsed electromagnetic radiation. Such delays are conveniently achieved by using optical fibres of differing lengths so that they operate as delay lines. Arrays of 3×3 optical fibres are taught, each optical fibre connected to single avalanche photo-diode (APD).

In our co-pending UK patent application number 0322564.6, we have taught that an electromagnetic signal processing system may comprise a plurality of optical fibre arrays, each optical fibre array having a cluster of optical fibres with their one ends oriented to receive electromagnetic radiation and arrange to transmit electromagnetic radiation to an array output, the array outputs being connected to transmit electromagnetic radiation in sequence to a signal detector input. In this co-pending application we have also taught various additional features for such signal processing systems.

SUMMARY OF THE INVENTION

According to the present invention a signal processing system has at least two independent processing channels, a plurality of optical fibres with their one ends oriented to receive electromagnetic radiation, and couplers interconnecting the other ends of the optical fibres in parallel such that electromagnetic radiation transmitted by the optical fibres will be coupled together and then directed into each of the independent processing channels. In this manner the same optical signal arriving at an array of optical fibres can be split into different independent channels for processing.

At least one of the independent processing channels preferably includes a processing board with an output to a signal detector. At least one of the processing boards may include electrical and/or optical signal processing components.

At least one of the independent processing channels is preferably arranged to transmit the electromagnetic radiation in sequence to a single detector input. This can be achieved as taught in our co-pending UK patent application 0322564.6. Preferably another independent processing channel may be arranged to transmit the electromagnetic radiation in sequence to another signal detector input, and the independent processing channels incorporate different optical delays to minimise any range/position ambiguity.

One of the independent processing channels may be arranged to transmit electromagnetic radiation in sequence to a signal detector unit, and another independent processing channel arranged to transmit the electromagnetic radiation to a processing board configured to assess the range and depth of a target.

By providing at least two independent processing channels, it is possible for each independent processing channel to contain different signal detectors. This enables the electromagnetic radiation to be assessed with different sensitivities for different tasks, for different wavelengths, and for other different physical characteristics.

By having at least two independent processing channels, the invention also enables one processing channel to feed signals into at least one of the other channels. This feature greatly enhances the processing of received electromagnetic radiation.

BRIEF DESCRIPTION OF THE DRAWINGS

The invention will now be described, by way of example only, with reference to the accompanying drawings in which.

DETAILED DESCRIPTION OF EMBODIMENTS

Figure 1:
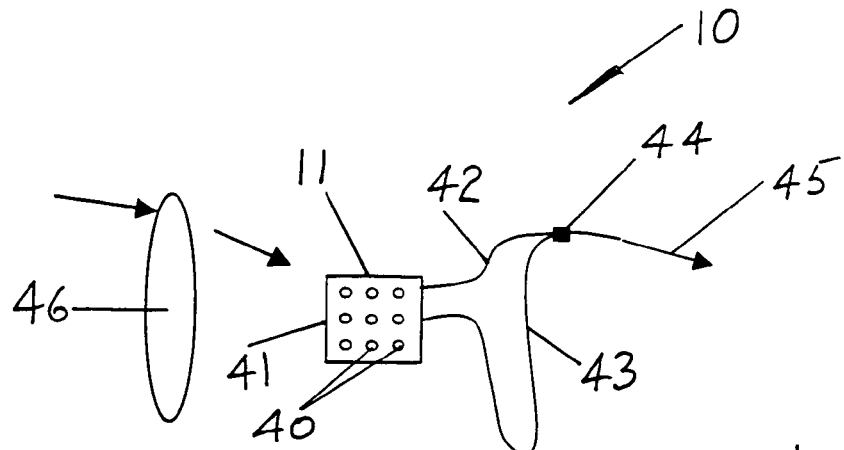
FIG. 1 is a diagram illustrating our current technique of connecting optical fibres to a detector.

With reference to FIG. 1, a signal processing system 10, comprises an optical fibre cluster or array 11 having nine optical fibres, one end of each fibre being depicted by the small circles 40. The set of nine fibres is positively located in predetermined relative positions in an array board 41 which, in use, would be mounted to face the direction from which an electromagnetic signal may be received. Although the array board 41 is show as being rectangular with optical fibres 40 arranged equally-spaced in a 3×3 matrix, the array board 41 may be of any convenient shape and its cluster of optical fibres 40 may be any required number arranged in any suitable manner to receive electromagnetic radiation. The optical fibre array 41 is depicted in a simplified manner with only two optical fibres 42, 43 for the right-hand column being drawn. It should be understood that all nine optical fibres of the array board 41 have different lengths, as shown in FIG. 1, so that there is an in-built time delay between the transmission by each optical fibre. The optical fibres 42, 43 are shown joined in parallel by a 2-in-to-1 coupler 44 to a single output 45. The other optical fibres 40 forming the array board 41 would similarly be connected in parallel to the output 45 by respective couplers 44.

An optical system 46 is used to direct incoming electromagnetic signals on to the ends of the optical fibres 40.

Figure 2:
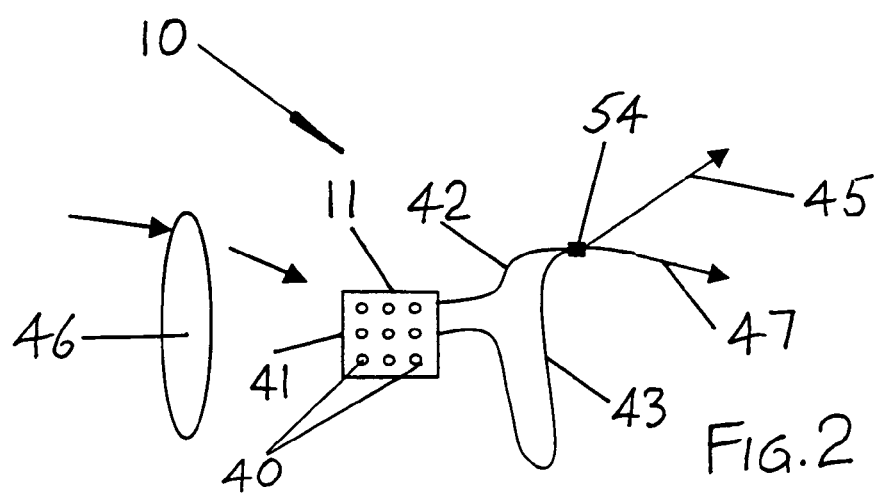
FIG. 2 is a diagram illustrating one embodiment of the present invention.

The present invention is illustrated by FIG. 2 in which the same reference numerals have been used to indicate equivalent features. The primary difference is that the coupler 44 of FIG. 1 has been replaced by a 2-in-to-2 coupler 54 which couples the optical fibres 42 and 43 together, but then directs the combined signal into two separate, and therefore independent, processing channels defined by the output 45 and a second output 47. This configuration enables the independent processing channels 45, 47 to feed the electromagnetic radiation into different signal processors. One of the independent processing channels 45, 47 may be provided with a processing board with an output to a signal detector, the processing board including electrical and/or optical signal processing components.

The other independent processing channel 47 or 45 can be arranged to transmit the electromagnetic radiation in sequence to a signal detector input as taught by our aforesaid co-pending UK patent application.

Figure 3:
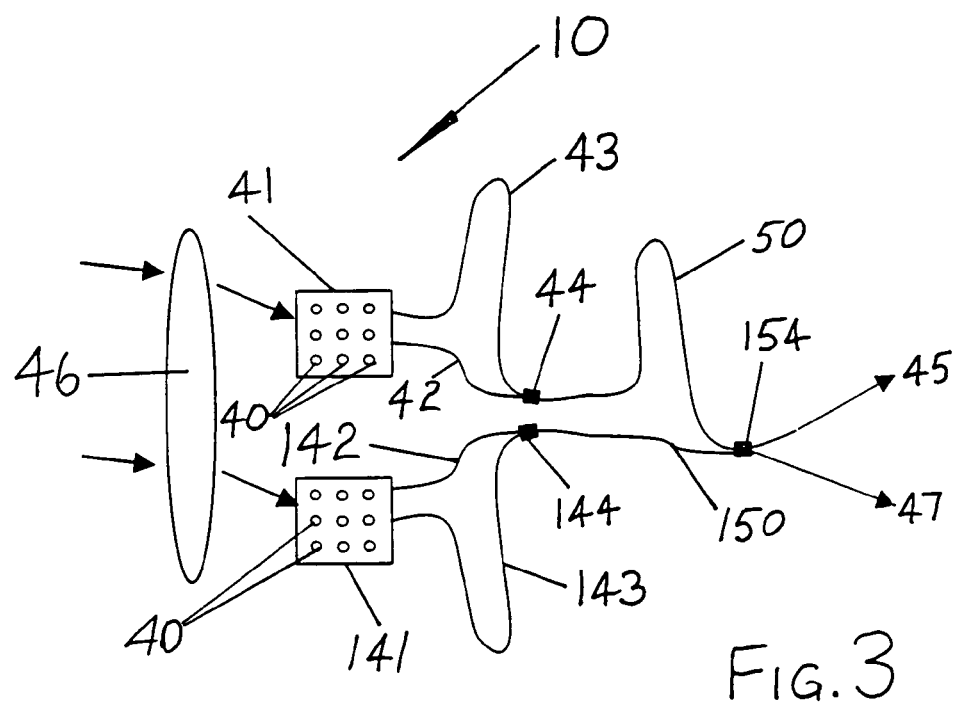
FIG. 3 is a diagram illustrating a further embodiment of the present invention.

In FIG. 3, two array boards 41 and 141 are provided with electromagnetic radiation through the same optical system 46. The optical fibres 42 and 43 are connected in parallel by a 2-in-to-1 connector 44 to an optical fibre 50, whereas optical fibres 142 and 143 from array board 141 are connected in parallel by a 2-in-to-1 connector 144 to an optical fibre 150.

It will be noted that the optical fibre 50 is longer than the optical fibre 150 whereby any signal transmitted by optical fibre 50 to coupler 154 will be delayed relative to a signal through the shorter optical fibre 150. This cascading of the optical fibres 50 and 150 enables the respective signals to be differentiated by a signal detector.

However, the coupler 154 serves to split the combined signal into the two independent processing channels 45 and 47 for separate processing in the same manner as has been described with reference to FIG. 2.

Instead of using 2-in-to-2 couplers, N-in-to-M couplers may be used so that any number of inputs can be combined together and then split into any number of independent processing channels.

A primary advantage of the invention is that the same optical signal arriving at an array board 41, or 141, will be split into different independent processing channels.

In the real system there would be many other fibres feeding into the independent processing channels 45 and 47. Typically, multiple array boards 41 or 141 would be individually mounted to face a direction from which an electromagnetic signal might be received. They may face either in the same direction or may be oriented to receive electromagnetic radiation from different directions. Instead of being mounted in the array boards, the optical fibres 40 could be mounted directly through any convenient support structure.

In addition to directing the electromagnetic signal into two or more independent processing channels 45, 47, this approach also enables signals to be fed back from a stage in one channel to a stage in another channel, and vice versa, whereby detection of a signal characteristic in one processing channel can be used to affect the processing of the same signal in another channel. This enables the formation of very complex processing architectures.

In one example, one of the independent processing channels could have a cascaded structure as taught in our aforesaid co-pending UK patent application, whilst another independent processing channel could include a processing board incorporating electrical and/or optical components to process signals, the processing board being fed with all fibres from the array (not just from one cluster) into the signal detector. In this manner the detector would receive a series of pulses which would permit the range and depth of a target to be deduced. The depth of the target being the difference between the front and the back edges of the signal.

In another example, two independent processing channels could have cascaded structures as taught in our aforesaid co-pending UK patent application, but with the channels using different time delays. This configuration enables issues, such as the "range/position ambiguity" to be minimised or eliminated.

In a further example, the independent processing channels could contain different detectors, for instance with different sensitivities for different tasks, different wavelengths, and other differing parameters.

The invention claimed is:

1. A signal processing system comprising:
at least two independent processing channels,
a plurality of optical fibres arranged in a known array with their one ends oriented to receive electromagnetic radiation, said fibres arranged to cause varying delays in the transmission of electromagnetic radiation passing therethrough; and
couplers interconnecting the other ends of said optical fibres in parallel whereby electromagnetic radiation transmitted by said optical fibres is coupled together and then directed into each of the independent processing channels.

2. A signal processing system, according to claim 1, in which at least one of said independent processing channels includes a processing board with an output to a signal detector.

3. A signal processing system, according to claim 2, in which at least one of said processing boards includes signal processing components selected from the group comprising electrical and optical signal processing components.

4. A signal processing system, according to claim 1, in which at least one of said independent processing channels is arranged to transmit the electromagnetic radiation in sequence to a signal detector input.

5. A signal processing system, according to claim 4, in which another of said independent processing channels is arranged to transmit the electronic radiation in sequence to another signal detector input, and said independent processing channels incorporate different optical delays to minimise any range/position ambiguity.

6. A signal processing system, according to claim 1, in which one of said independent processing channels is arranged to transmit electromagnetic radiation in sequence to a signal detector unit, and another of said independent processing channels is arranged to transmit the electromagnetic radiation to a processing board configured to assess the range and depth of a target.

7. A signal processing system, according to claim 1, in which two of said independent processing channels contain different signal detectors.

8. A signal processing system, as in claim 1, in which at least one of said independent processing channels is arranged to feed signals into at least one other independent processing channel.

9. A signal processing system comprising:
at least two independent processing channels,
a plurality of optical fibres arranged in a known array with their one ends oriented to receive electromagnetic radiation, said fibres comprising a means for varying delays in the transmission of electromagnetic radiation passing through said fibres; and
couplers interconnecting the other ends of said optical fibres in parallel whereby electromagnetic radiation transmitted by said optical fibres is coupled together and then directed into each of the independent processing channels.

10. A signal processing system, according to claim 9, in which at least one of said independent processing channels includes a processing board with an output to a signal detector.

11. A signal processing system, according to claim 10, in which at least one of said processing boards includes signal processing components selected from the group comprising electrical and optical signal processing components.

12. A signal processing system, according to claim 9, wherein said means for varying delay comprises fibres of differing fibre length.

13. A signal processing system comprising:
at least two independent processing channels,
a plurality of optical fibres arranged in a known array, each fibre having two ends, the end of each fibre oriented to receive electromagnetic radiation, each fiber having a length different from other fibres and providing a different delay to transmission of electromagnetic radiation through said fibre; and
couplers interconnecting the other ends of said optical fibres in parallel whereby electromagnetic radiation transmitted by said optical fibres is coupled together and then directed into each of the independent processing channels.

14. A signal processing system, according to claim 13, in which at least one of said independent processing channels includes a processing board with an output to a signal detector.

15. A signal processing system, according to claim 14, in which at least one of said processing boards includes signal processing components selected from the group comprising electrical and optical signal processing components.

16. A signal processing system, according to claim 13, in which at least one of said independent processing channels is arranged to transmit the electromagnetic radiation in sequence to a signal detector input.

17. A signal processing system, according to claim 16, in which another of said independent processing channels is arranged to transmit the electronic radiation in sequence to another signal detector input, and said independent processing channels incorporate different optical delays to minimise any range/position ambiguity.

18. A signal processing system, according to claim 13, in which one of said independent processing channels is arranged to transmit electromagnetic radiation in sequence to a signal detector unit, and another of said independent processing channels is arranged to transmit the electromagnetic radiation to a processing board configured to assess the range and depth of a target.

19. A signal processing system, according to claim 13, in which two of said independent processing channels contain different signal detectors.

20. A signal processing system, as in claim 13, in which at least one of said independent processing channels is arranged to feed signals into at least one other independent processing channel.

* * * * *